(12) United States Patent
Borisov et al.

(10) Patent No.: US 9,419,823 B2
(45) Date of Patent: Aug. 16, 2016

(54) POWER LINE COMMUNICATION WITHOUT LINE COUPLERS

(71) Applicant: Itron, Inc., Liberty Lake, WA (US)

(72) Inventors: Vladimir Borisov, Seneca, SC (US); Philippe Chiummiento, Fontenay-aux-Roses (FR)

(73) Assignee: Itron, Inc., Liberty Lake, WA (US)

( * ) Notice: Subject to any disclaimer, the term of this patent is extended or adjusted under 35 U.S.C. 154(b) by 598 days.

(21) Appl. No.: 13/830,417

(22) Filed: Mar. 14, 2013

(65) Prior Publication Data

US 2014/0269953 A1    Sep. 18, 2014

(51) Int. Cl.
*H04L 25/02* (2006.01)
*H04B 3/56* (2006.01)

(52) U.S. Cl.
CPC .............. *H04L 25/0272* (2013.01); *H04B 3/56* (2013.01); *H04B 2203/5483* (2013.01)

(58) Field of Classification Search
CPC ... H04L 25/0266; H04L 25/0272; H04L 3/56; H04B 2203/5462; H04B 2203/5429; H04B 2203/5404; H04B 2203/54; H04B 2203/5483
USPC .............................................................. 307/1
See application file for complete search history.

(56) References Cited

U.S. PATENT DOCUMENTS

| | | | | |
|---|---|---|---|---|
| 6,373,377 B1* | 4/2002 | Sacca et al. | | 375/257 |
| 7,103,240 B2* | 9/2006 | Kline | | H02G 11/02 307/3 |
| 7,633,774 B2* | 12/2009 | Ichihara | | H04B 3/54 307/2 |
| 2004/0157474 A1* | 8/2004 | Rapaich | | G06F 1/26 439/43 |
| 2004/0227621 A1* | 11/2004 | Cope et al. | | 340/310.01 |
| 2006/0170285 A1* | 8/2006 | Morimitsu | | B61L 15/0036 307/3 |
| 2009/0210737 A1* | 8/2009 | Tajima | | H04L 12/40045 713/340 |
| 2009/0296431 A1 | 12/2009 | Borisov | | |
| 2010/0027515 A1* | 2/2010 | Hylton | | B61L 25/025 370/338 |

FOREIGN PATENT DOCUMENTS

CA      2738844 A1 * 7/2011
WO  WO 2012/150962 A1 * 8/2012 .......... H02M 7/2173

OTHER PUBLICATIONS

Mustafizur Rahman, Choong Seon Hong, and Sungwon Lee, Medium Access Control for Power Line Communications: An Overview of the IEEE 1901 and ITU-T G.hn Standards, Jun. 2011, IEEE Comunications Magazine pp. 183-189.*
"Using Ohm's Law to Build a Voltage Divider", developed by IEEE as part of TryEngineering, p. 11.*
PCT Search Report and Written Opinion mailed Jun. 23, 2014 for PCT Application No. PCT/US14/24565, 9 Pages.

* cited by examiner

*Primary Examiner* — Jared Fureman
*Assistant Examiner* — Michael Warmflash
(74) *Attorney, Agent, or Firm* — Lee & Hayes, PLLC

(57) ABSTRACT

A disclosed PLC system includes a PLC modem electrically connected to a transmission medium that transmits or carries medium or high voltage without electrical isolation. The PLC system further includes a voltage divider that draws power from the transmission medium to the PLC modem, thereby eliminating a need of a separate power source for operating the PLC modem. Since the PLC modem is electrically connected to the transmission, the PLC modem or communication connections of the PLC modem may be located at a same potential level as the transmission medium and thus the PLC modem does not see a surge during a surge event occurs in the transmission medium. Therefore, the disclosed PLC system eliminates the use of a line coupler and a surge protection component for providing high-voltage isolation and surge protection to the PLC modem.

18 Claims, 3 Drawing Sheets

POWER LINE COMMUNICATION WITHOUT LINE COUPLERS

BACKGROUND

Power line communication (PLC) is a communication technology that transmits data or signals over a transmission network originally intended for power transmission or distribution. The transmission network may include a variety of transmission mediums or lines each adapted for transmitting a low, medium or high voltage over a distance within the transmission network. In order to transmit data or signal over a transmission medium or line, a PLC modem is devised and used for modulating data or signals to be sent, injecting the data or signals to be sent into a transmission medium, receiving data or signals to be read, and/or demodulating the data or signal to be read.

Although PLC technology has proven to be useful and has attracted widespread attention in a number of application areas, for example, autonomous metering architecture (AMI) networks, the implementation of this PLC technology in these application fields is not without difficulties. For example, PLC modems are traditionally located at a ground level and connected to the transmission mediums or lines that carry medium or high voltages through line couplers. The line couplers are used to isolate low-voltage communication devices from medium or high voltage transmission mediums or lines and to protect the PLC modems from surges and transients. However, these line couplers are usually expensive in both cost and implementation. Furthermore, because of the cost or absence of suitable power sources to provide low voltage for the PLC modems, installation and maintenance of these PLC modems in rural or remote areas impose extra cost and burden to an operator of the PLC modems.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As noted above, because of the high-voltage isolation and surge protection requirements for use in medium or high voltage transmission lines, implementations and maintenance of PLC modems have been very costly. Furthermore, the cost or lack of suitable power sources to provide a low voltage for PLC modems also pose another difficulty to the application of the power line communication in such locations as rural or remote areas.

Figure 1:
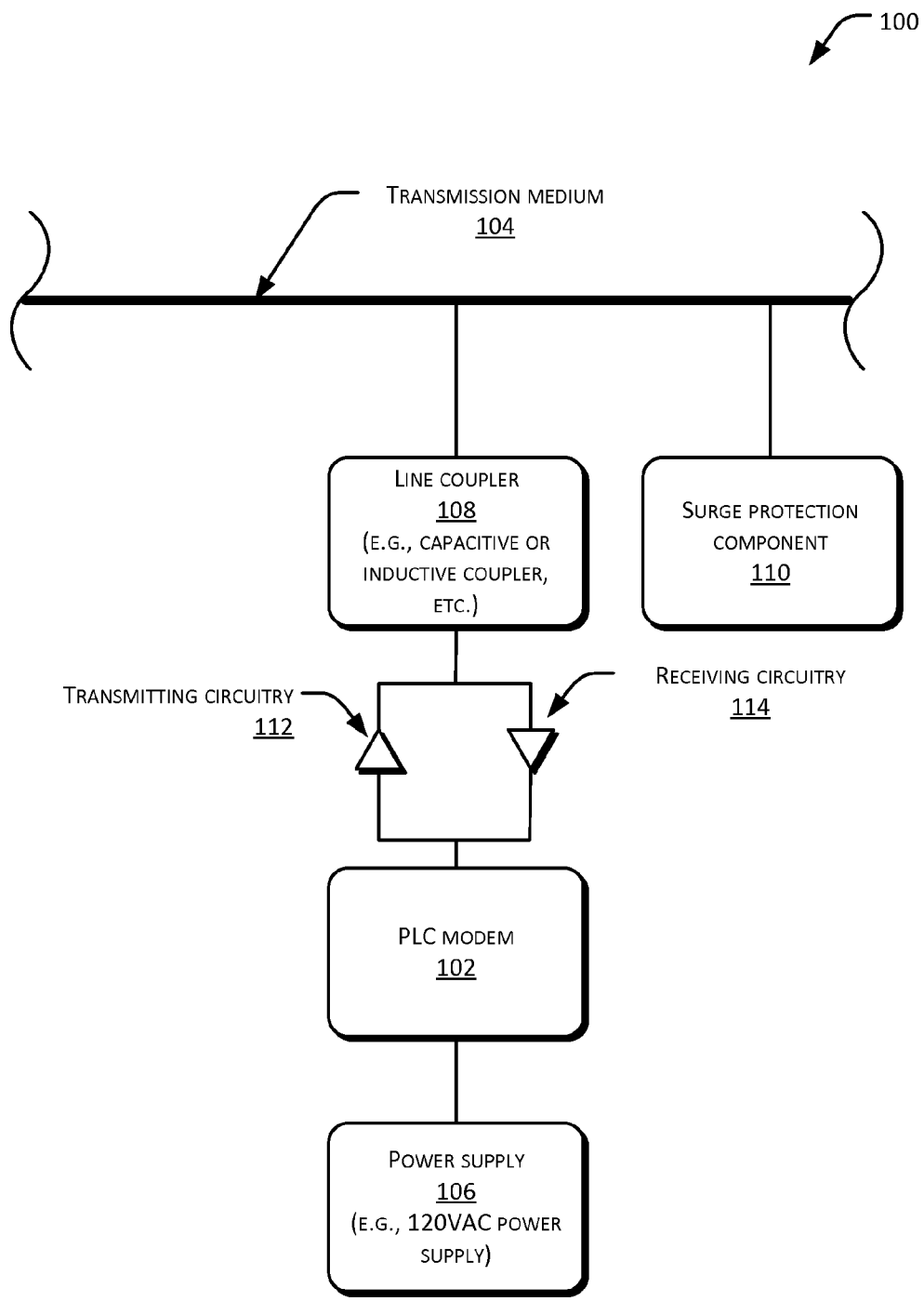
FIG. 1 illustrates a conventional PLC configuration.

FIG. 1 shows a conventional PLC configuration 100. In this example, the PLC configuration 100 may include a PLC modem 102, a transmission medium 104 carrying a medium or high voltage, a power supply 106, a line couple 108 and a surge protection component 110. The power supply 106 provides 120 VAC power to the PLC modem 102 to enable operations of the PLC modem 102. The PLC modem 102 is configured to modulate data or signals to be sent and inject the data or signals into the transmission medium 104. Furthermore, the PLC modem 102 may receive data or signals from the transmission medium 104 and demodulate the data or signals.

In this conventional implementation, the PLC modem 102 is connected to the transmission medium 104 through the line coupler 108. The line coupler 108 is configured to isolate the PLC modem 102 from the transmission medium 104 and thus provide high-voltage isolation for the PLC modem 102. Examples of the line coupler 108 may include a capacitive coupler (such as a coupling capacitor) or an inductive coupler (such as a coupling transformer) that isolates the PLC modem 102 from the transmission medium 104. The surge protection component 110 is configured to protect the PLC modem 102 from surges and transients due to instabilities and/or fluctuations in voltage and/or current that are carried in the transmission medium 104. Both the line coupler 108 and the surge protection component 110 are grounded.

In this conventional implementation, the PLC configuration 100 may further include a transmitting circuitry 112 and a receiving circuitry 114. The transmitting circuitry 112 facilitates transmission of signals from the PLC modem 102 to the transmission medium 104 while the receiving circuitry 114 relays signals from the transmission medium 104 to the PLC modem 102.

Although the above conventional PLC configuration 100 can provide high-voltage isolation and surge protection for the PLC modem 102, the implementation and maintenance of the line coupler 108 and the surge protection component 110 in this configuration 100 is very costly. Furthermore, the power supply 106 for the PLC modem 102 may be expensive and may not be readily available in remote or rural areas. Even if a battery-powered source may be used for the PLC modem 102, frequent monitoring and maintenance of this battery-powered source are needed in order to ensure that a power level of this battery-powered source is sufficient for operating the PLC modem 102.

In view of the above observations, this disclosure describes a PLC system that involves an electrical (conductive or galvanic) connection of a PLC modem to a transmission medium or line that is configured to transmit a medium (e.g., 1-35 kilovolts) or high voltage (e.g., voltages above 35 kilovolts). This PLC system enables the PLC modem to connect to the transmission medium or line without a line coupler (e.g., a coupling capacitor or transformer, etc.). As used herein, an electrical (conductive or galvanic) connection between two points is defined as a physical connection that allows a flow of direct current (DC) between the two points or a connection that provides an electrically conductive path between the two points and so makes possible a flow of a current between the two points. In contrast, a connection or coupling between two points through a capacitive device (such as a capacitor), an inductive device (such as a transformer), an optocoupler or other coupling device that provides electrical (conductive or galvanic) isolation or prevents a flow of DC current between the two points is not an electrical (conductive or galvanic) connection as that term is used herein.

Furthermore, the described system may include a voltage divider that delivers power to the PLC modem. For example, the voltage divider may connect to the transmission medium or line and draw medium or high AC (i.e., alternating current) voltage power from the transmission medium or line and provide DC (i.e., direct current) power to the PLC modem. In one implementation, the voltage divider may act as a suitable power source for the PLC modem and provide (or draw) the power to the PLC modem where there is a transmission medium or line currently carrying power or voltage, thus eliminating a need of a separate or designated power source. For example, the voltage divider may provide a low voltage 120V source for the PLC modem.

In one implementation, the described system may further include a current/voltage limiting component that is connected in series with the voltage divider. The current/voltage limiting component may include a resistor having a resistance that minimizes or limits an amount of voltage exposed to the voltage divider when a surge occurs on the transmission medium. Additionally or alternatively, the system may choose the resistance of the current/voltage limiting component to enable a surge current that will pass through the voltage divider during the surge to be manageable by a predetermined number of diodes associated with the voltage divider for a given magnitude of surge current.

The described system eliminates the need of expensive isolation mechanisms (such as a line coupler) between a PLC modem and a transmission medium or line that carries a medium or high voltage to fulfill the high-voltage isolation and the surge protection requirements. Therefore, the described system reduces the cost of implementing and maintaining the PLC modem for use with the high/medium voltage transmission medium or line. Furthermore, by employing a voltage divider, the described system can provide a suitable power source to the PLC modem from the transmission medium or line without requiring a separate or designated power source for the PLC modem.

The application describes multiple and varied embodiments and implementations. The following section describes an example environment that is suitable for practicing various implementations. Next, the application describes example systems, devices, and processes for implementing a PLC system.

Example Environment

Figure 2:
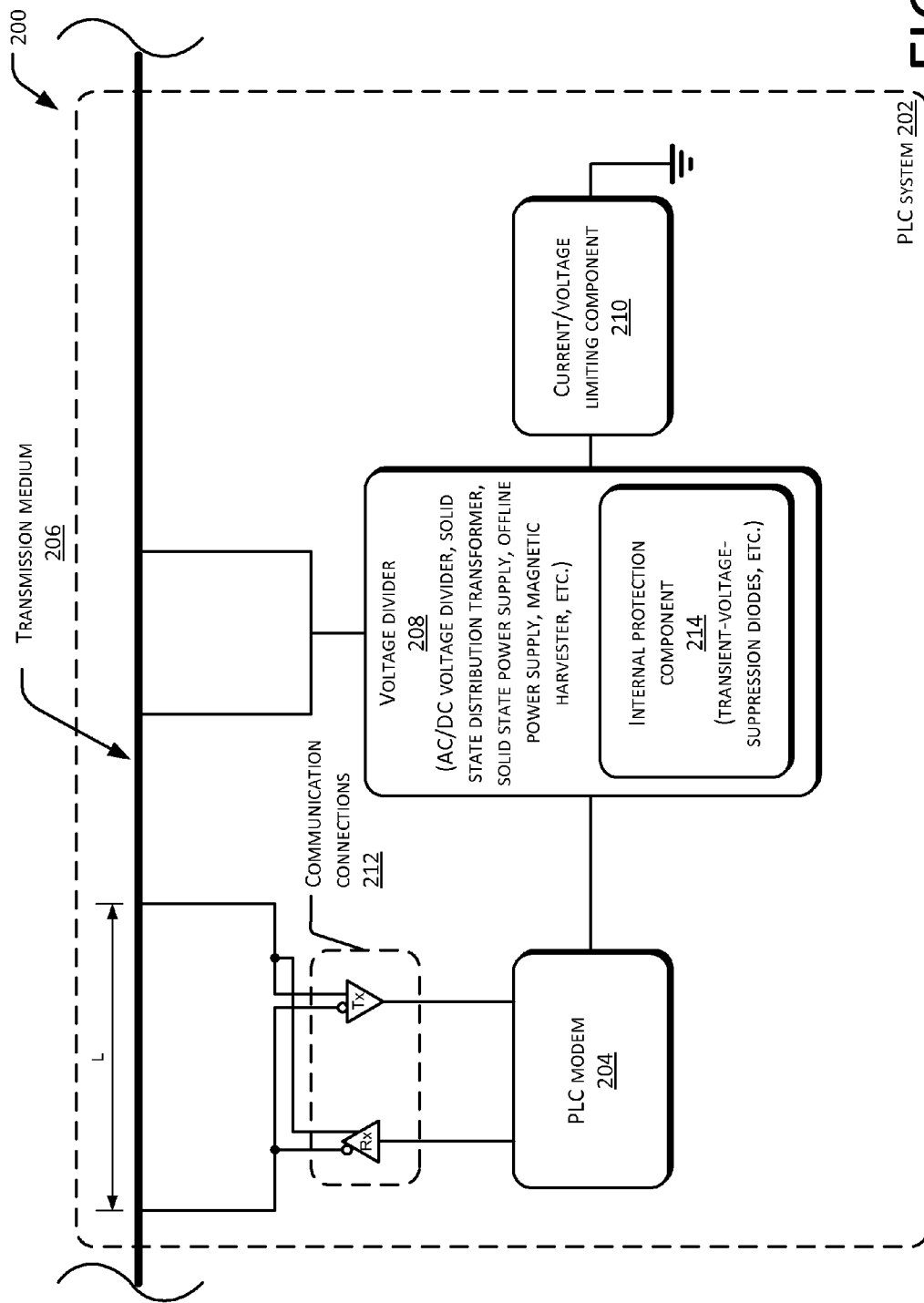
FIG. 2 illustrates an example environment usable to implement a PLC system.

FIG. 2 is a schematic diagram of an example environment 200 usable to implement a PLC system 202. The environment 200 may further include a PLC modem 204, a transmission medium 206, a voltage divider 208 and a current/voltage limiting component 210. In this example, the PLC modem 204 is connected to the transmission medium 206 and is located at a same potential as the transmission medium 206. Furthermore, the voltage divider 208 is connected in series with the current/voltage limiting component 210, with one end of the voltage divider 208 connected to a first point on the transmission medium 206 and the other end of the voltage divider 208 connected to a second point on the transmission medium 206 through the current/voltage limiting component 210. In one implementation, the PLC system 202 may be considered to include the PLC modem 204, the voltage divider 208 and the current/voltage limiting component 210. In some implementations, the PLC system 202 may further include a portion of the transmission medium 204 connected to the PLC modem 204, the voltage divider 208 and/or the current/voltage limiting component 210.

The PLC modem 204 may include a PLC modem that is conventionally developed for power line communication (e.g., the PLC modem 102 as shown in FIG. 1) in a particular type of power transmission network, for example, an autonomous metering architecture (AMI) network. In some implementations, the PLC modem 204 may include the PLC modem 102 with a modified power amplifier useful for dealing with small inductive loads. The PLC modem 204 is configured to transmit or receive signals over the transmission medium 206 through communication connections 212. For example, the PLC modem 204 may modulate data to be sent and inject a high frequency signaling current into the transmission medium 206 through the communication connections 212. In one implementation, the PLC modem 204 or the communication connections 212 of the PLC modem 204 may be at a same potential level as a high or hot side of the transmission medium 206 and may not be grounded (i.e., ungrounded) or at a ground potential. Additionally or alternatively, the PLC modem 204 or the communication connections 212 may be allowed to float at a voltage potential of the transmission medium 206.

The transmission medium 206 may include a distribution line (or an electrical line, a conduction line, etc.) that is intended or used for transmitting power in a power distribution network. In one implementation, the transmission medium 206 is used for transmitting or carrying a medium voltage (e.g., 1-35 kilovolts) or a high voltage (e.g., voltages greater than 35 kilovolts) in the power distribution network.

The voltage divider 208 may include an AC/DC (alternating current/direct current) voltage divider. An example of the AC/DC voltage divider may be found in, for example, Canadian patent application, application number CA 2,738,844, titled "Full Wave AC/DC Voltage Divider," filed on May 4, 2011. In some implementations, the voltage divider 208 may alternatively include a solid state distribution transformer, a solid state power supply, an offline power supply or a magnetic harvester, etc.

The current/voltage limiting component 210 may include a resistor or other electrical component that is capable of limiting a current or voltage to be exposed to the voltage divider 208.

In one implementation, the PLC modem 204 may be electrically (conductively or galvanically) connected to the transmission medium 206. Additionally, the PLC modem 204 may be connected to the transmission medium 206 without isolation, for example, without a line coupler (such as the line coupler 108 in FIG. 1) in between. By electrically connecting the PLC modem 204 to the transmission medium 206, the PLC modem 204 does not see a surge, thus eliminating a need of isolation between the PLC modem 204 and the transmission medium 206. This is because the PLC modem 204 and the transmission medium 206 are at equipotential with each other, or in other words, correspond to two points on a same equipotential line.

In some implementations, the voltage divider 208 may connect to the transmission medium 206 and draw power from the transmission medium 206 to the PLC modem 204. For example, the voltage divider 208 may act as a suitable power source for the PLC modem 204 and draw medium or high AC voltage power from the transmission medium 206 and provide a low (e.g., 120 V) DC power to the PLC modem 204. Therefore, the voltage divider 208 eliminates a need of a separate or designated power source (such as the power source 106 in FIG. 1) for the PLC modem 204, thereby further reducing the cost and complexity of the PLC system 202.

In one implementation, the current/voltage limiting component 210 may be connected in series with the voltage divider 208. The current/voltage limiting component 210 may be selected to have a resistance or impedance that minimizes or limits an amount of voltage exposed to the voltage divider 208 when a surge occurs on the transmission medium 206. Additionally or alternatively, the PLC system 202 may choose the resistance or impedance of the current/voltage limiting component 206 to enable a surge current that will pass through the voltage divider 208 during the surge to be manageable by an internal protection component 214 associated with the voltage divider 204 for a given magnitude of surge current. In the example of using the AC/DC voltage divider as the voltage divider 208, the internal protection component 214 may include a predetermined number of diodes that clamp voltage that is applied to each cell of a multi-level charge pump of the AC/DC voltage divider by a certain voltage, e.g., 400 V (Volt). Examples of these diodes associated with the AC/DC voltage divider may include transient-voltage-suppression (TVS) diodes having a defined surge current rating, e.g., 2 A (Amps).

By way of example and not limitation, the resistance or impedance of the current/voltage limiting component 210 may be chosen to be of an order of $10^6 \Omega$ (Ohm) so that a majority of transient voltage will be applied to the current/voltage limiting component 210 during a surge event. Furthermore, in this example, the surge current through the voltage divider 208 may be reduced to a current having magnitude of about 100 mA which is manageable by the TVS diodes (having a surge current rating of 2 A, for example) associated with the voltage divider 208.

In some implementations, additionally or alternatively, the PLC modem 204 may inject a high frequency signaling current into the transmission medium 206. For example, the PLC modem 204 may inject the high frequency signaling current into conducting wire or line conductor of a specified length "L" to induce a signaling voltage. The conducting wire or line conductor of a specified length may include, for example, a length of the transmission medium 206 or a separate length or loop of conducting wire. The PLC modem 204 may apply the signaling voltage to the transmission medium 206 in series therewith. In one implementation, the PLC modem 204 may utilize a frequency range between 150 kHz and 500 kHz. A 1-meter long electrical or line conductor may have a specific inductance of 1 μH (micro-Henry). A reactance (inductive impedance) of 1 μH inductor is 3Ω at 500 kHz. Therefore, a signaling current of 1 A circulating in the loop may create about a signaling voltage of 3 V. Alternatively, the specific reactance of electrical conductor may exceed 1Ω per meter at the lowest frequency allowed in this frequency range. Induction of a PLC signal of 1 V magnitude may need a current of 1 A at 150 kHz which is three times less than that at 500 kHz.

By relocating the PLC modem 204 from a ground level or potential to a high or hot side (e.g., a medium or high potential or voltage) of the transmission medium 206, the PLC system 202 therefore eliminates the requirements associated with the high-voltage isolation and protection using a line coupler (such as the line coupler 108 in FIG. 1). Furthermore, this configuration of electrically (conductively or galvanically) connecting the PLC modem 204 to the transmission medium 206 will meet the same requirements at a less cost due to an inexpensive protection scheme based on the current/voltage limiting component 210 that is otherwise unacceptable for the line coupler.

Exemplary Method

Figure 3:
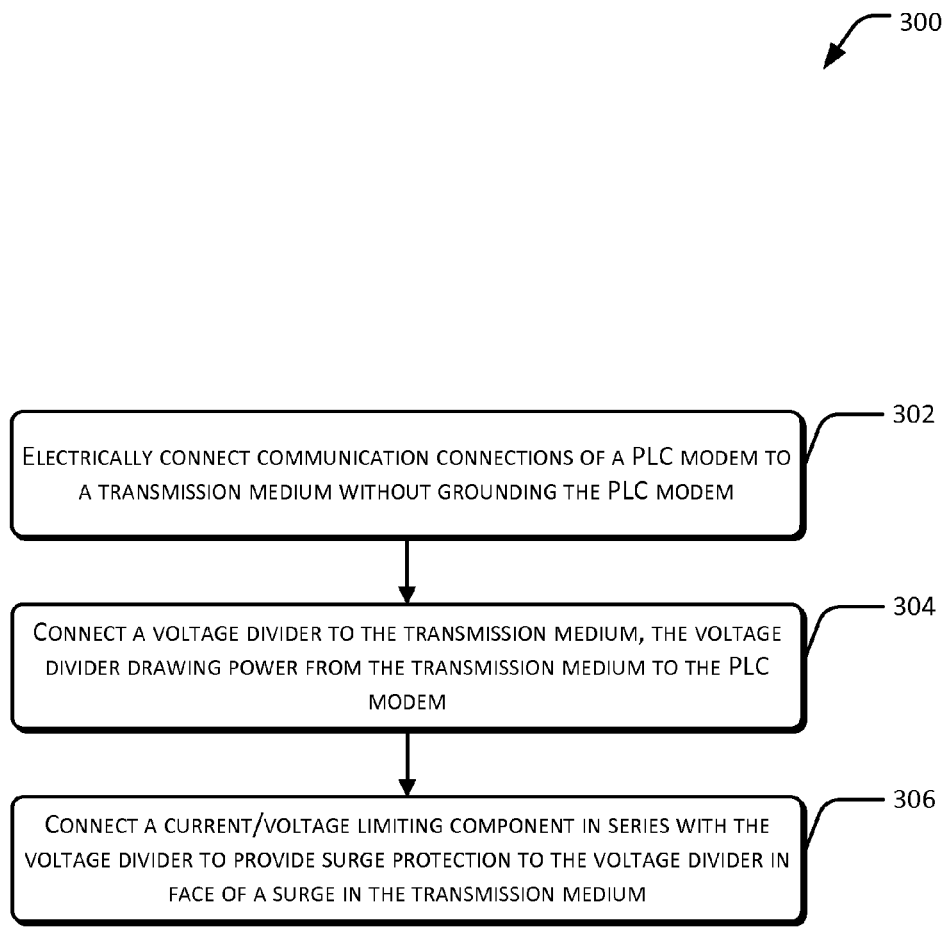
FIG. 3 illustrates an example method of setting up the system with reference to FIG. 2.

FIG. 3 shows an example method 300 of setting up the PLC system 302. The method of FIG. 3 may, but need not, be implemented in the environment of FIG. 2. For ease of explanation, method 300 is described with reference to FIG. 2. However, the method 300 may alternatively be implemented in other environments and/or using other devices or systems.

The exemplary method is illustrated as a collection of blocks in a logical flow graph representing a sequence of operations. The order in which operations within the method are described is not intended to be construed as a limitation, and any number of the described method blocks may be combined in any order to implement the method, or alternate methods. Additionally, individual blocks may be omitted from the method without departing from the spirit and scope of the subject matter described herein.

Referring back to FIG. 3, at block 302, the PLC modem 204 is electrically connected to the transmission medium 206 which is configured to transmit or carry a medium or high voltage in a power distribution network. In one implementation, PLC modem 204 is ungrounded and/or allowed to float at a voltage potential of the transmission medium 206. Additionally or alternatively, the PLC modem 204 or the communication connections 214 of the PLC modem 204 may be positioned at a same potential or voltage level as the transmission medium 206.

At block 304, the voltage divider 208 is connected to the transmission medium 206 to draw medium or high AC voltage power from the transmission medium 206 and provide low DC power to the PLC modem 204.

At block 306, the current/voltage limiting component 210 is connected in series with the voltage divider 208 to provide an additional surge protection to the voltage divider 208 in face of a surge in the transmission medium 204.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A system comprising:
a power line communication (PLC) modem electrically connected to a transmission medium configured to transmit a medium or high voltage, a voltage divider electrically connected to the transmission medium and configured to receive medium or high voltage power from the transmission medium and deliver power to the PLC modem;
wherein the PLC modem is electrically connected to the transmission medium without a line coupler, and
wherein the PLC modem is electrically connected to the transmission medium without electrical isolation between the PLC modem and the transmission medium.

2. The system as recited in claim 1, wherein the PLC modem is ungrounded and is allowed to float at a voltage of the transmission medium.

3. The system as recited in claim 1, wherein the power delivered to the PLC modem by the a voltage divider is DC (direct current) power.

4. The system as recited in claim 3, wherein the voltage divider comprises an AC/DC (alternating current/direct current) voltage divider, a solid state distribution transformer, a solid state power supply, an offline power supply or a magnetic harvester.

5. The system as recited in claim 4, wherein the voltage divider draws medium or high voltage AC power from the transmission medium and delivers DC power to the PLC modem.

6. The system as recited in claim 3, further comprising a current/voltage limiting component that is in series with the voltage divider, the current/voltage limiting component minimizing a voltage exposed to the voltage divider when a surge occurs on the transmission medium.

7. The system as recited in claim 6, wherein a resistance of the current/voltage limiting component is chosen to enable a surge current that will pass through the voltage divider during the surge to be manageable by an internal protection component associated with the voltage divider for a given surge current magnitude.

8. The system as recited in claim 7, wherein the internal protection component comprises a plurality of transient-voltage-suppression diodes.

9. The system as recited in claim 6, wherein a first end of the current/voltage limiting component is connected to a first end of the voltage divider, a second end of the current/voltage limiting component is connected to a neutral potential, and a second end of the voltage divider is connected to the transmission medium.

10. The system as recited in claim 1, wherein voltage potentials of the PLC modem and the transmission medium correspond to two points on a same equipotential line.

11. The system as recited in claim 1, wherein the PLC modem is configured to transmit or receive signals over the transmission medium.

12. The system as recited in claim 1, wherein the PLC modem is configured to inject a high frequency signaling current into the transmission medium.

13. The system as recited in claim 12, wherein the PLC modem injects the high frequency signaling current into a length of wire to induce a signaling voltage.

14. The system as recited in claim 13, wherein the signaling voltage is applied to the transmission medium in series.

15. A device comprising:
a power line communication (PLC) modem configured to transmit or receive signals over a transmission medium configured to transmit a medium or high voltage, the PLC modem being connected to the transmission medium without a line coupler, the PLC modem being galvanically connected to the transmission medium without electrical isolation between the PLC modem and the transmission medium for high voltage isolation and surge protection; and
a voltage divider connected to the transmission medium and configured to receive medium or high voltage AC (alternating current) power from the transmission medium and deliver DC (direct current) power to the PLC modem.

16. The device as recited in claim 15, wherein the voltage divider comprises an AC/DC voltage divider, a solid state distribution transformer, a solid state power supply, an offline power supply or a magnetic harvester.

17. The device as recited in claim 15, wherein communication connections of the PLC modem are at a same voltage potential as the transmission medium.

18. A method comprising:
electrically connecting communication connections of a power line communication (PLC) modem to a transmission medium configured to transmit a medium or high voltage without grounding the PLC modem, the PLC modem being connected to the transmission medium without a line coupler, the PLC modem being directly electrically connected to the transmission medium without electrical isolation between the PLC modem and the transmission medium; and
connecting a voltage divider to the transmission medium to deliver power from the transmission medium to the PLC modem.

* * * * *